United States Patent Office 3,457,287
Patented July 22, 1969

3,457,287
METAL AND AMMONIUM N-HYDROXYMETHYL AND N,N - BIS(HYDROXYMETHYL)CARBAMOYLSULFONATES
Dietrich H. Heinert and Bill E. Burgert, Midland, Mich., assignors to The Dow Chemical Company, Midland, Mich., a corporation of Delaware
No Drawing. Filed Apr. 20, 1967, Ser. No. 632,886
Int. Cl. C07f *7/22, 1/04;* C07c *143/14*
U.S. Cl. 260—429.7                     5 Claims

ABSTRACT OF THE DISCLOSURE

Carbamoylsulfonate salts react with formaldehyde to form the corresponding N-hydroxymethyl and N,N-bis (hydroxymethyl) salts depending upon the proportion of formaldehyde used. These compounds are generally colorless, water-soluble solids which liberate formaldehyde slowly upon standing and therefore have a germicidal effect.

BACKGROUND OF THE INVENTION

This invention relates to new chemical compounds. It relates particularly to reaction products of formaldehyde with certain amido sulfonic acid salts.

Preparations of salts of carbamoylsulfonic acid are described in German Patent 290,426 (1916) and in copending United States application Ser. No. 589,528, filed Oct. 26, 1966. A convenient method of preparation is also described in Example 1 of the present application. These salts represent essentially bisulfite adducts of the unstable cyanic scid and they are consequently a means of using that acid in chemical reactions.

SUMMARY OF THE INVENTION

It has now been discovered that salts of carbamoylsulfonic acid react with formaldehyde to produce the corresponding N - (hydroxymethyl)carbamoylsulfonate or the N,N-bis(hydroxymethyl)carbamoylsulfonate depending upon the proportion of formaldehyde used. These new compounds have the general formula

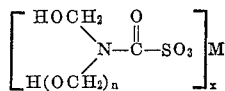

wherein $n$ is zero or one, M is a metal, ammonium, or substituted ammonium ion, and $x$ is the valence of M. They are generally water-soluble, relatively stable compounds at room temperature which, however, liberate formaldehyde slowly upon standing. They are useful preservatives and bacteriostats which prevent or inhibit microbial growth and attack when incorporated in concentrations of 0.05 percent or more in organic dispersions and mixtures such as adhesives, latex paint compositions, dispersible oils, grease compositions, and the like.

DETAILED DESCRIPTION

In the above general formula, M can represent any salt-forming cation such as set forth above. Thus, M can be an alkali metal, an alkaline earth metal such as calcium or barium, or other metals such as cadmium, mercury, iron or aluminum. M can also be the ammonium radical or a substituted ammonium radical such as tetramethylammonium, benzyltrimethylammonium, lauryldimethylammonium and the like. Compounds where M is alkali metal, particularly sodium or potassium, or ammonium are preferred. The ammonium salts are of particular interest since these are decomposable to gaseous products upon heating to about 100° C.

The compounds of this invention are easily prepared by contacting a carbamoylsulfonate of the general formula

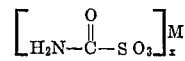

with formaldehyde in solution at about room temperature or below. Preferably, the reaction is carried out in aqueous solution at 0–30° C. The monohydroxymethyl salts are made by reacting molar equivalents of the two reactants. Bis(hydroxymethyl) salts are made by reacting the carbamoylsulfonate with at least two equivalents, preferably 3–5 equivalents of formaldehyde. When the preparation is carried out in aqueous solution, the reaction product is generally more soluble in water than the starting carbamoylsulfonate and so the reaction product is then an aqueous solution. The hydroxymethylated carbamoylsulfonate can be isolated by any of various conventional procedures. A preferred method is evaporation of the water and any excess of formaldehyde under reduced pressure, particularly from the frozen solution by the so-called freeze-dry technique. Another method is the addition of methanol or tetrahydrofuran to the aqueous solution, whereupon the salt precipitates.

It is sometimes desirable to make less water-soluble salts by first hydroxymethylating the alkali metal or ammonium carbamoylsulfonate and then reacting the product solution with a suitable salt of the desired metal, thereby precipitating the less soluble metal carbamoylsulfonate.

Example 1

A suspension of 131.8 g. of sodium cyanate in 400 ml. of water was cooled on an ice bath and 500 g. of ice was added to the mixture to adjust its temperature to 5° C. Sulfur dioxide was bubbled into the stirred mixture while the temperature was maintained below 15° C. The suspended sodium cyanate gradually dissolved during this procedure and completion of the reaction was indicated by the formation of a clear solution. A total of 128.2 g. of sulfur dioxide was absorbed. The solution was then diluted with 450 ml. of methanol and 2650 ml. of tetrahydrofuran, causing the formation of a crystalline precipitate. The cooled suspension was filtered and the collected solid was dried at room temperature under reduced pressure to obtain 260.2 g. of crystalline sodium carbamoylsulfonate.

Example 2

Sodium carbamoylsulfonate (5.5 g.) was added with stirirng to 3.1 g. of 36% aqueous formaldehyde at room temperature. An additional 5 ml. of water was added to dissolve all of the sodium salt. After standing at room temperature for one half hour, the resulting solution was frozen in solid carbon dioxide and water was removed by freeze-drying at less than 0.1 mm. The product thereby obtained was a colorless solid, weight 6.2 g. Infrared spectroscopy and elemental analysis showed the product to be the monohydrate of sodium N-(hydroxymethyl)carbamoylsulfonate.

Example 3

A quantity of 50 g. of sodium carbamoylsulfonate was added slowly with stirring to 126.1 g. of 36% aqueous formaldehyde. An additional 50 ml. of water was added to dissolve all of the sodium salt. The resulting solution was stirred for one hour at room temperature. The solution was then frozen and water was separated as in Example 2 to obtain 68.2 g. of a colorless solid identified by infrared spectroscopic examination and elemental analysis as the monohydrate of sodium NN-bis(hydroxymethyl)carbamoylsulfonate.

Example 4

Aqueous stannous chloride was added to a solution of sodium N,N-bis(hydroxymethyl)carbamoylsulfonate in water to precipitate stannous N,N-bis-(hydroxymethyl) carbamoylsulfonate. This compound was a white amorphous, essentially water-insoluble solid.

Example 5–7

The N,N,-bis(hydroxymethyl)carbamoylsulfonic acid salts of calcium, aluminum, and mercury (ic) were prepared by adding solutions of calcium chloride, aluminum sulfate, and mercuric chloride respectively to aqueous sodium N,N - bis(hydroxymethyl)carbamoylsulfonate. These salts were water-soluble solids.

The metal salts of monohydroxymethylcarbamoylsulfonic acid corresponding to the bis(hydroxymethylated) salts of Example 4–7 are prepared similarly and have similar properties.

By a method such as described above, other metal and ammonium hydroxymethylated carbamoylsulfonates are prepared. In this way, there are obtained potassium N-(hydroxymethyl)carbamoylsulfonate, cadmium N,N-bis(hydroxymethyl)carbamoylsulfonate, ferrous N-(hydroxymethyl)carbamoylsulfonate, ammonium N - (hydroxymethyl) carbamoylsulfonate, benzyltrimethylammonium N,N - bis(hydroxymethyl)carbamoylsulfonate, and other salts of the class previously outlined.

We claim:
1. A compound of the formula

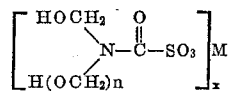

wherein $n$ is zero or one, M is a metal ion, an ammonium ion, or a substituted ammonium ion, and $x$ is the valence of M.

2. The compound of claim 1 wherein M is alkali metal and $x$ is one.
3. The compound of claim 2 wherein M is sodium and $n$ is zero.
4. The compound of claim 2 wherein M is sodium and $n$ is one.
5. The compound of claim 1 wherein M is tin, $x$ is two, and $n$ is one.

References Cited
UNITED STATES PATENTS

| | | | |
|---|---|---|---|
| 3,031,483 | 4/1962 | Koopmans et al. | 260—429.7 |
| 3,305,442 | 2/1967 | Nishimoto et al. | 260—429.7 |
| 3,317,589 | 5/1967 | Vitalis et al. | 260—513 |
| 3,334,133 | 8/1967 | McGrath | 260—513 |
| 3,364,254 | 1/1968 | Sexsmith | 260—513 |

TOBIAS E. LEVOW, Primary Examiner
W. F. W. BELLAMY, Assistant Examiner

U.S. Cl. X.R.
260—431, 429, 439, 448, 513, 999